(12) United States Patent
Kim et al.

(10) Patent No.: US 8,692,965 B2
(45) Date of Patent: Apr. 8, 2014

(54) METHOD AND APPARATUS OF FORMING ALIGNMENT LAYER FOR LIQUID CRYSTAL DISPLAY DEVICE

(75) Inventors: Chang Dong Kim, Seoul (KR); Hyun Sik Seo, Anyang-si (KR); Kwang Hoon Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 680 days.

(21) Appl. No.: 12/766,632

(22) Filed: Apr. 23, 2010

(65) Prior Publication Data

US 2010/0203793 A1 Aug. 12, 2010

Related U.S. Application Data

(62) Division of application No. 11/289,447, filed on Nov. 30, 2005, now Pat. No. 7,728,933.

(30) Foreign Application Priority Data

Feb. 7, 2005 (KR) .......................... 10-2005-0011317

(51) Int. Cl.
*G02F 1/1337* (2006.01)
(52) U.S. Cl.
USPC .......................................................... 349/124
(58) Field of Classification Search
USPC .......................................................... 349/124
See application file for complete search history.

(56) References Cited

U.S. PATENT DOCUMENTS

| 4,892,392 A | 1/1990 | Broer |
| 5,256,456 A | 10/1993 | Ogawa |
| 5,438,421 A | 8/1995 | Sugawara et al. |
| 5,604,615 A | 2/1997 | Iwagoe et al. |
| 5,742,370 A | 4/1998 | Kim et al. |
| 6,195,146 B1 | 2/2001 | Chaudhari et al. |
| 7,196,758 B2 | 3/2007 | Crawford et al. |
| 2002/0024625 A1 | 2/2002 | Anderson et al. |

FOREIGN PATENT DOCUMENTS

| CN | 1178919 A | 4/1998 |
| EP | 1 384 743 | 7/2003 |
| JP | 02-33127 | 2/1990 |
| JP | 04-372932 | 12/1992 |
| JP | 05-080340 | 4/1993 |
| JP | 06-118413 | 4/1994 |
| JP | 07-013168 | 1/1995 |
| JP | 09-197410 | 7/1997 |
| JP | 09-244024 | 9/1997 |
| JP | 09-244025 | 9/1997 |
| JP | 10-123525 | 5/1998 |
| JP | 11-133430 | 5/1999 |
| KR | 1998-026045 | 7/1998 |
| KR | 10-0210376 | 4/1999 |

*Primary Examiner* — James Dudek
(74) *Attorney, Agent, or Firm* — McKenna Long & Aldridge LLP (57) ABSTRACT

A method for forming an alignment layer is disclosed, to prevent light leakage generated by a physical contact between a rubbing roll and a substrate, which includes preparing a substrate; coating an alignment material on the substrate, for initial alignment of liquid crystal; applying an electric field or a magnetic field to the alignment material, for determination of alignment direction in the alignment material; and curing the alignment material.

9 Claims, 12 Drawing Sheets

METHOD AND APPARATUS OF FORMING ALIGNMENT LAYER FOR LIQUID CRYSTAL DISPLAY DEVICE

CROSS-REFERENCE TO RELATED APPLICATIONS

This application is a Divisional of application Ser. No. 11/289,447 filed Nov. 30, 2005, now U.S. Pat. No. 7,728,933 now allowed, which claims priority to Korean Patent Application No. 10-2005-0011317, filed Feb. 7, 2005, all of which are hereby incorporated by reference for all purposes as if fully set forth herein.

BACKGROUND OF THE INVENTION

1. Field of the Invention

The present invention relates to a liquid crystal display (LCD) device, and more particularly, to an alignment layer for initial alignment of liquid crystal in an LCD device.

2. Discussion of the Related Art

Among various ultra-thin flat type display devices, which include a display screen having a thickness of several centimeters, a liquid crystal display (LCD) device has great attention because of its wide variety of uses, including notebook computers, monitors, spacecraft, aircraft, and etc.

Generally, the LCD device includes a color filter substrate having a color filter layer, a thin film transistor substrate having a thin film transistor, and a liquid crystal layer formed between the color filter substrate and the thin film transistor substrate. At this time, the thin film transistor substrate is positioned opposite to the color filter substrate.

In the LCD device, an alignment direction of the liquid crystal layer is changed according to application of voltage, thereby controlling the transmittance of light. Accordingly, images are displayed in the LCD device. For application of voltage, electrodes are formed on the thin film transistor substrate and the color filter substrate. That is, a pixel electrode is formed on the thin film transistor substrate, and a common electrode is formed on the color filter substrate, whereby an electric field is vertically formed between the thin film transistor substrate and the color filter substrate (for example, Twisted Nematic (TN) mode). In another method, the pixel electrode and the common electrode may be foamed on the thin film transistor substrate, thereby forming an electric field parallel to the two substrates (for example, In-Plane Switching (IPS) mode).

Figure 1:
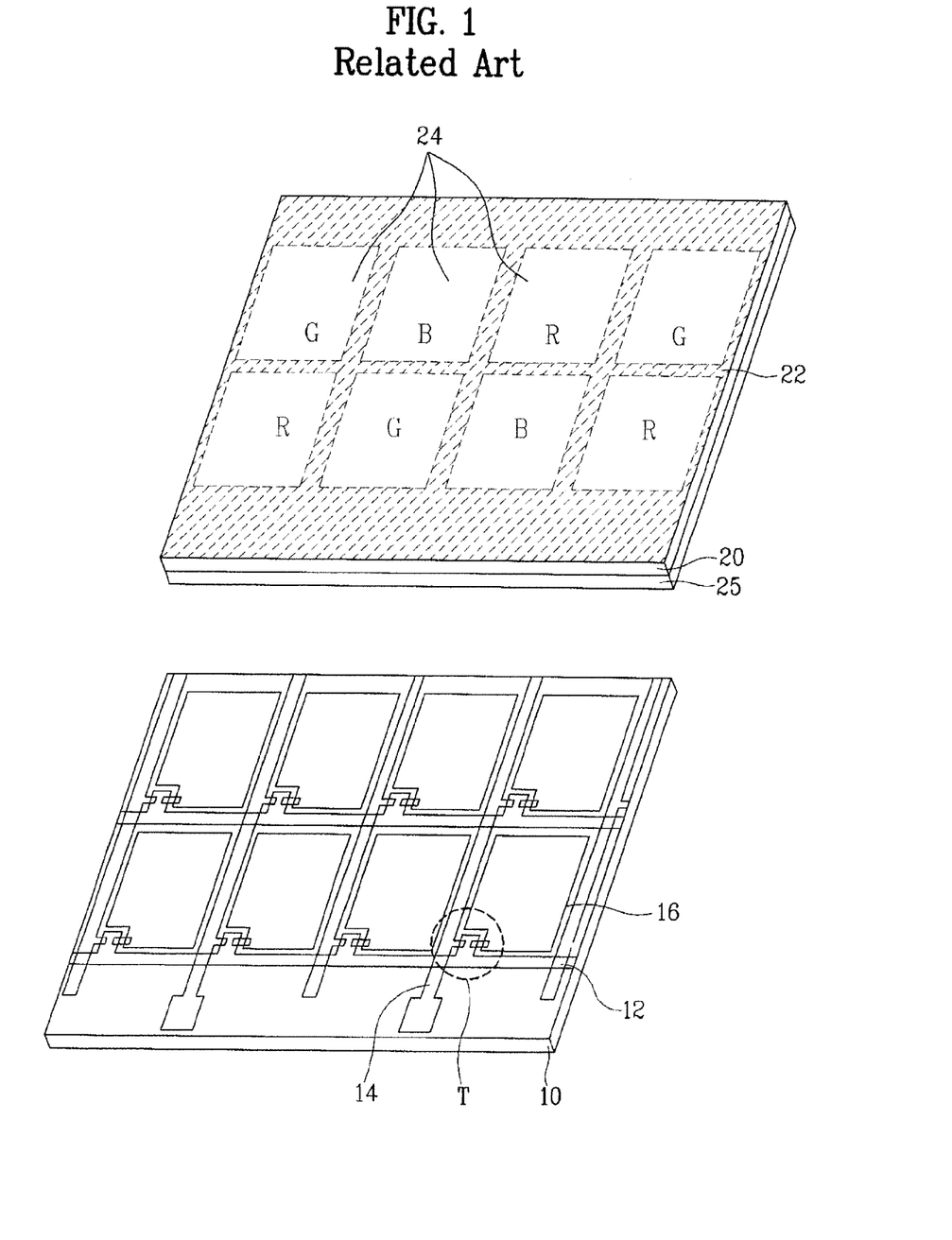
FIG. 1 is an exploded perspective view of illustrating an LCD device according to the related art.

FIG. 1 is an exploded perspective view of a TN mode LCD device according to the related art. As shown in FIG. 1, a thin film transistor substrate 10 of the TN mode LCD device according to the related art includes a gate line 12, a data line 14, a thin film transistor T, and a pixel electrode 16. At this time, the thin film transistor T is formed at a crossing of the gate and data lines 12 and 14, and the pixel electrode 16 is connected with the thin film transistor T. Also, a color filter substrate 20 includes a black matrix layer 22 including black matrix patterns for prevention of light leakage, a R/G/B color filter layer 24 having red, green and blue color patterns, each color pattern provided between the black matrix patterns, and a common electrode 25 formed on the R/G/B color filter layer 24. In this case, an electric field is vertically formed between the pixel electrode 16 of the thin film transistor substrate 10 and the common electrode 25 of the color filter substrate 20, thereby controlling the alignment direction of liquid crystal.

Thereafter, the substrates 10 and 20 are attached to each other to form one liquid crystal panel in which a liquid crystal layer is formed between the substrates 10 and 20.

In the meantime, when forming the liquid crystal layer between the two substrates 10 and 20, regular alignment of liquid crystal molecules is required. For this, although not shown, alignment layers are provided on the thin film transistor substrate 10 and the color filter substrate 20 for initial alignment of liquid crystal.

The alignment layer for initial alignment of liquid crystal is generally formed in a rubbing alignment method.

The rubbing alignment method includes steps of coating a thin filming of an organic polymer such as polyimide on a substrate, aligning a side chain of the organic polymer to a predetermined direction by rubbing the coated organic polymer by rotating a rubbing roll coated with rubbing cloth, and curing the aligned organic polymer.

Accordingly, the liquid crystal is aligned according to the aligned direction of the side chain of the organic polymer. That is, the moving direction of the rubbing roll corresponds to the alignment direction of liquid crystal.

However, the rubbing alignment method has the following disadvantages.

First, when the rubbing cloth is irregular, there may be resulting light leakage because of improper or no alignment of the liquid crystal.

Figure 2:
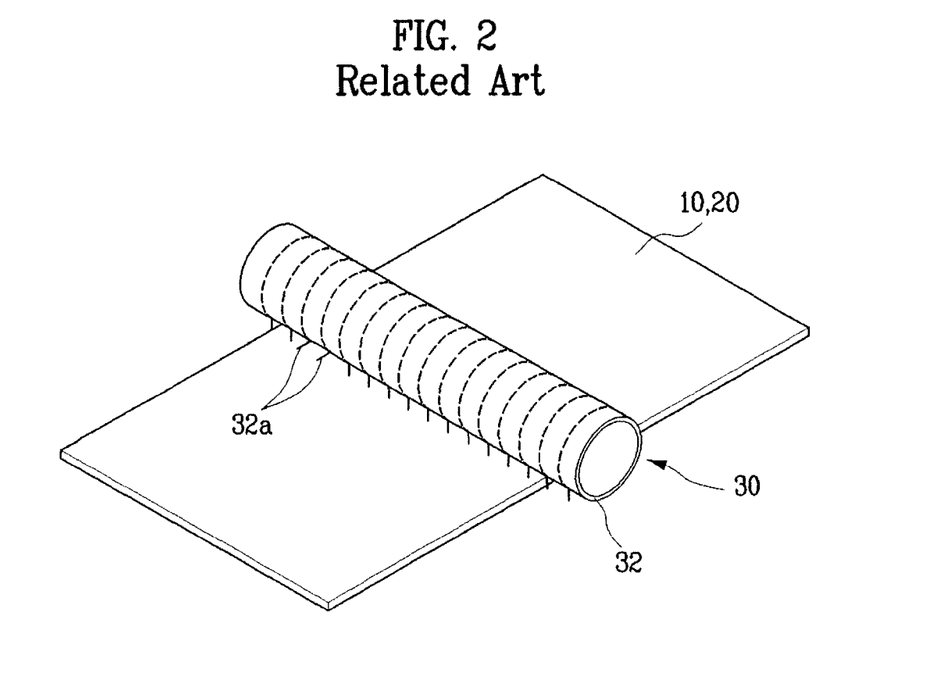
FIGS. 2 and 3 are perspective views of illustrating problems of rubbing alignment according to the related art.

FIG. 2 is a perspective view of illustrating the problem generated by the irregular rubbing cloth.

As illustrated in FIG. 2, the elements such as the thin film transistor, the color filter layer and the electrode layer are formed on the substrate. Thus, when the rubbing roll 30 coated with the rubbing cloth 32 rotates on the elements formed on the substrate 10 or 20, some portion 32a of the rubbing cloth 32 may be irregular. As a result, the side chain of the organic polymer on the portion of the substrate rubbed with the irregular portion 32a of the rubbing cloth 32 is not aligned or not aligned properly. Therefore, there may be the light leakage due to the irregular alignment of liquid crystal.

Second, when the rubbing cloth does not in contact with the substrate, there may be light leakage.

Figure 3:
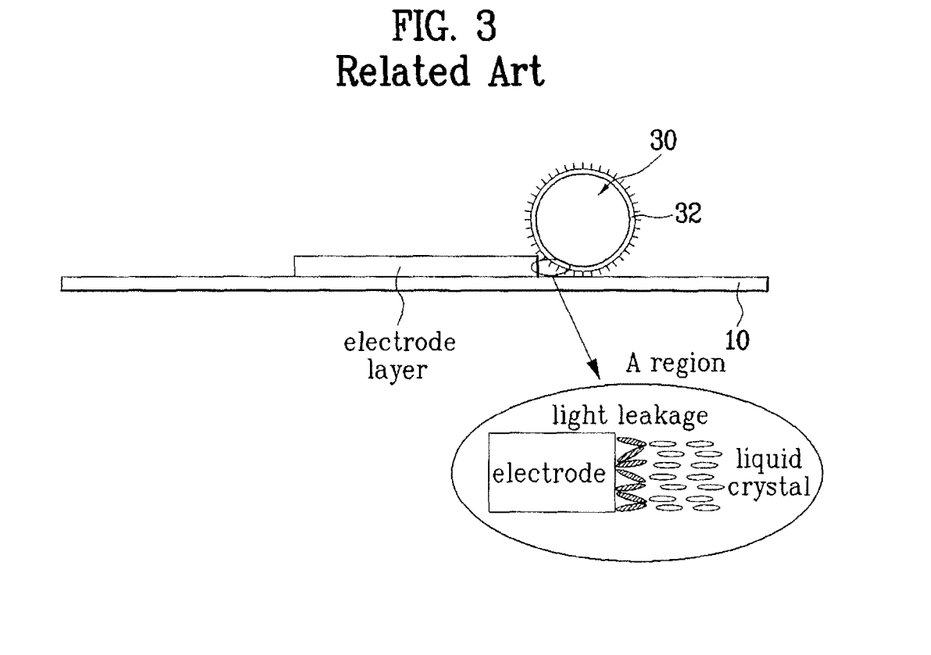

FIG. 3 is a perspective view illustrating the alignment state of liquid crystal when the rubbing cloth is not in contact with the substrate.

As explained earlier, electrode layers, such as pixel electrodes and a common electrode, are formed on a substrate. Due to a step height in electrode layers formed on a substrate 10, as illustrated in FIG. 3, a region (region "A") is formed where a rubbing cloth 32 does not come into contact with the substrate 10. In this case, the alignment of a liquid crystal is not uniform in the region ("A"), resulting in light leakage.

In conclusion, according to a related art rubbing alignment method, when the arrangement of a rubbing cloth is non-uniform or a rubbing cloth does not come into contact with a substrate, rubbing cannot be performed well, causing the problem of light leakage. Thus, there is a need for a novel liquid crystal alignment method to solve the problems of the related art rubbing alignment method.

The above-mentioned problems of the related art rubbing alignment method are attributed to physical contact between a rubbing roll and a substrate.

SUMMARY OF THE INVENTION

Accordingly, the present invention is directed to a method for forming an alignment layer that substantially obviates one or more problems due to limitations and disadvantages of the related art.

An advantage of the present invention is to provide a method for forming an alignment layer to prevent light leakage caused by physical contact between a rubbing roll and a substrate.

Another advantage of the present invention is to provide an alignment layer formation unit to prevent light leakage caused by physical contact between a rubbing roll and a substrate.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method for forming an alignment layer of an LCD device includes steps of preparing a substrate; coating an alignment material on the substrate, for initial alignment of liquid crystal; applying an electric field or a magnetic field to the alignment material, for determination of alignment direction in the alignment material; and curing the alignment material.

Instead of a related rubbing alignment method, a method for forming an alignment layer according to the present invention uses a field flux (e.g., an electric field or magnetic field) application method which does not require physical contact for a substrate.

At this time, the alignment direction of the alignment material is identical to the electric field application direction, and is perpendicular to the magnetic field application direction. Accordingly, it is preferable to apply the electric field in the same direction as the alignment direction of the alignment material. Also, it is preferable to apply the magnetic field in perpendicular to the alignment direction of the alignment material.

The electric field application method may use an electromagnet or a horseshoe magnet.

The step of applying an electric or magnetic field can be carried out by varying the direction of the field applied in a direction parallel, perpendicular or diagonal to the X-axis depending on the alignment direction of the alignment material. At this time, variation in the direction of the electric or magnetic field applied can be performed by rotating an electric or magnetic field generator while fixing the substrate applied with the alignment material, or rotating the substrate applied with the alignment material while fixing an electric or magnetic field generator.

The steps of coating the alignment material, applying the electric or magnetic field, and curing the alignment material are performed in sequence, for the decrease of process time.

In another aspect of the present invention, an alignment layer formation unit includes a substrate stage on which a substrate is loaded; an electric or magnetic field application part, formed in the periphery of the substrate stage; and a curing part for curing an alignment material of the substrate.

The electric field generator may include an anode and a cathode opposite to the anode through the substrate stage.

The magnetic field generator may be formed in such a manner that a horseshoe magnet surrounds the substrate stage or a pair of coiled electromagnets face each other through the substrate stage.

In addition, an alignment layer applicator may be provided before the electric field generator or the magnetic field generator.

In this case, the substrate stage may be moveable so as to consecutively move the substrate to the alignment layer applicator and the electric or magnetic field generator.

The electric or magnetic field generator may be rotatable so that the direction of the electric or magnetic field applied can be properly varied depending on the alignment direction of the alignment material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a method for forming an alignment layer according to the present invention will be described with reference to the accompanying drawings. As illustrated in the embodiments described herein, according to the present invention, a field flux (e.g., an electric field or a magnetic field) may be applied to an alignment layer to provide an alignment direction in accordance with the direction of the field flux.

FIGS. 4A to 4D illustrate forming an alignment layer of an LCD device by application of an electric field according to one embodiment of the present invention.

Figure 4A:
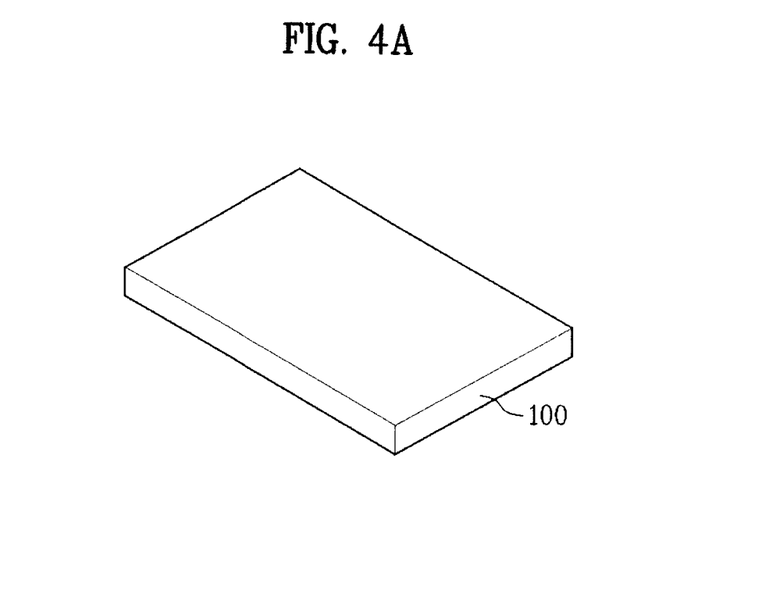
FIGS. 4A to 4D are process diagrams illustrating forming an alignment layer of an LCD device according to embodiment of the present invention.

First, as illustrated in FIG. 4A, a substrate 100 is prepared. The substrate 100 is one substrate for an LCD device, which may be a thin film transistor substrate including a thin film transistor, or may be a color filter substrate including a color filter layer. In this case, when the substrate is formed of the thin film transistor substrate or the color filter substrate, elements formed on the substrate may vary depending on the mode of the LCD device.

For example, in the case where the substrate 100 is a thin film transistor substrate for a TN (twisted nematic) mode liquid crystal display, gate lines and data lines crossing each other on a transparent substrate are formed to define pixel regions; thin film transistors including a gate electrode, a source electrode and a drain electrode are formed at crossings of the gate lines and the data lines; and pixel electrodes are formed within the pixel regions to connect to the drain electrode of the thin film transistors.

Further, in the case where the substrate 100 is a thin film transistor substrate for an in-plane switching (IPS) mode liquid crystal display, gate lines and data lines crossing each other on a transparent substrate are formed to define pixel regions; thin film transistors including a gate electrode, a source electrode and a drain electrode are formed at crossings of the gate lines and the data lines; pixel electrodes are formed within the pixel regions to connect to the drain electrode of the thin film transistors; and a common electrode is formed substantially parallel to the pixel electrodes.

Further, in the case where the substrate 100 is a color filter substrate for a TN mode liquid crystal display, a light-blocking layer is formed on a transparent substrate to prevent light from leaking; a green/red/blue color filter layer is formed on the light-blocking layer; and a common electrode is formed on top of the color filter layer.

Further, in the case where the substrate 100 is a color filter substrate for an IPS mode liquid crystal display, a light-blocking layer is formed on a transparent substrate to prevent light from leaking; a green/red/blue color filter layer is formed on the light-blocking layer; and an overcoat layer is formed on top of the color filter layer to planarize the substrate.

Modifications and variations of the materials and formation methods of the constituent elements formed on the substrate 100 will be appreciated by those skilled in the art.

In addition to a glass substrate, a flexible substrate or a plastic substrate can also be used as the transparent substrate.

Since physical contact occurs between a rubbing roll and a substrate in related art rubbing alignment methods, the use of flexible substrates causes problems. In contrast, since the method of the present invention uses a field flux (e.g., an electric field or a magnetic field), no physical contact is caused, which will be described in detail below. Accordingly, there is no problem in using flexible substrates in the present invention.

In the related art rubbing alignment method, it is necessary to coat an alignment material and to cure the coated alignment material. In the related art, the coated alignment material is cured at a high temperature of about 230° C. Accordingly, if a plastic substrate is used in the related art rubbing alignment method, the plastic substrate may be damaged or bent since plastic is very weak in heat.

However, in case of the alignment method according to the present invention which uses the electric field, a curing process is performed at a temperature below 100° C. Thus, the plastic substrate which is weak in relatively high heat in related art curing may be used in the alignment method according to the present invention.

Figure 4B:
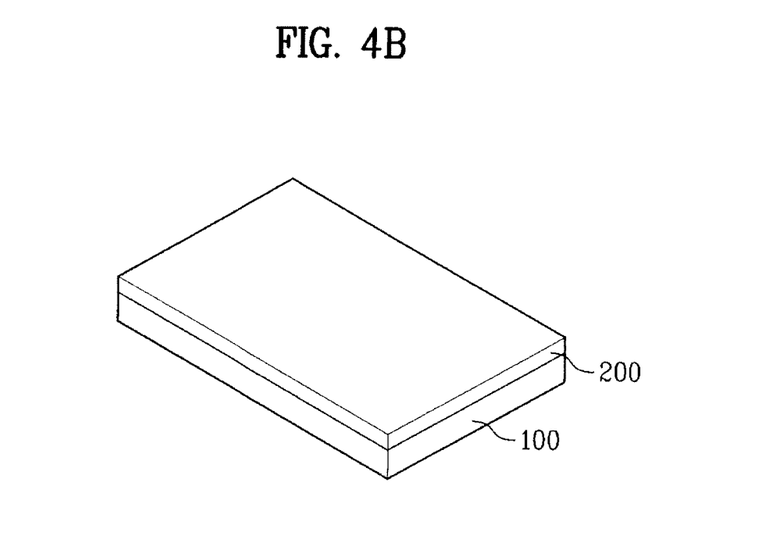

Referring to FIG. 4B, an alignment material 200 is coated on the substrate. The alignment material 200 may be formed any material of which an alignment direction is determined with application of electric field. The alignment material 200 may be formed of polymer selected from polyimide, polyamic acid, polyvinylcinnamate, polyazobenzene, polyethyleneimine, polyvinylalcohol, polyamide, polyethylene, polystylene, polyphenylenephthalamide, polyester, polyurethane, or polymethylmethacrylate.

Figure 4C:
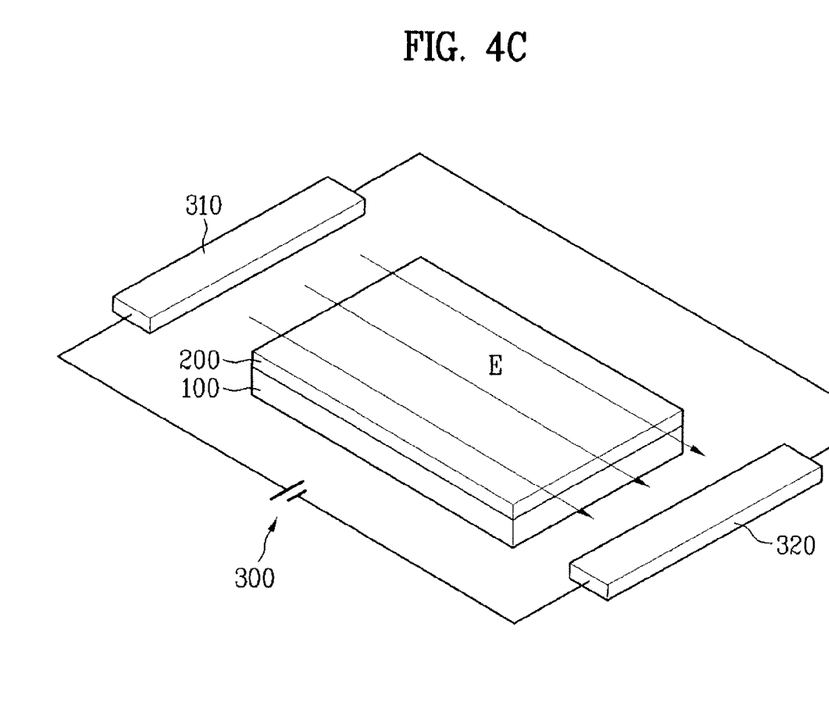

Then, as illustrated in FIG. 4C, an electric field E is applied to the alignment material 200 using an electric field generator 300 to determine the alignment direction of the alignment material 200.

The electric field generator 300 includes an anode 310 and a cathode 320 opposite to the anode through the substrate 100 applied with the alignment material 200. The electric field E is applied from the anode 310 to the cathode 320 as indicated by an arrow. Although the anode 310 and the cathode 320 do not come into contact with the substrate 100 in the figure, it is preferred that the anode 310 and the cathode 320 come into contact with both sides of the substrate 100 in view of the intensity of the electric field applied.

The alignment material 200 is aligned in the direction of electric field. The electric field may be applied in the same direction as the alignment direction of the alignment material 200.

Figure 5A:
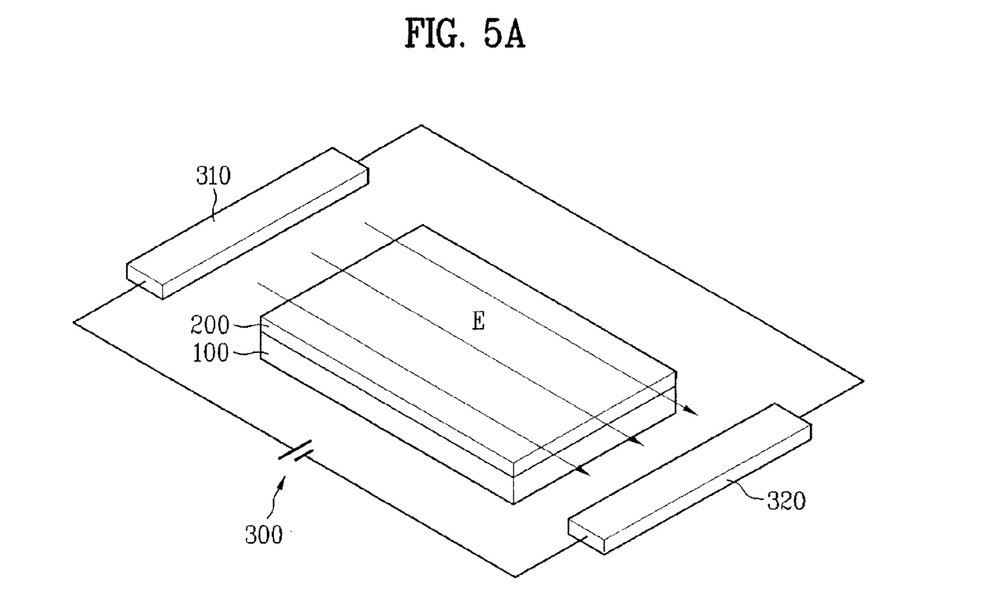
FIGS. 5A to 5C are process diagrams of showing the process for applying an electric field in an LCD device according to another embodiment of the present invention.
Figure 5B:
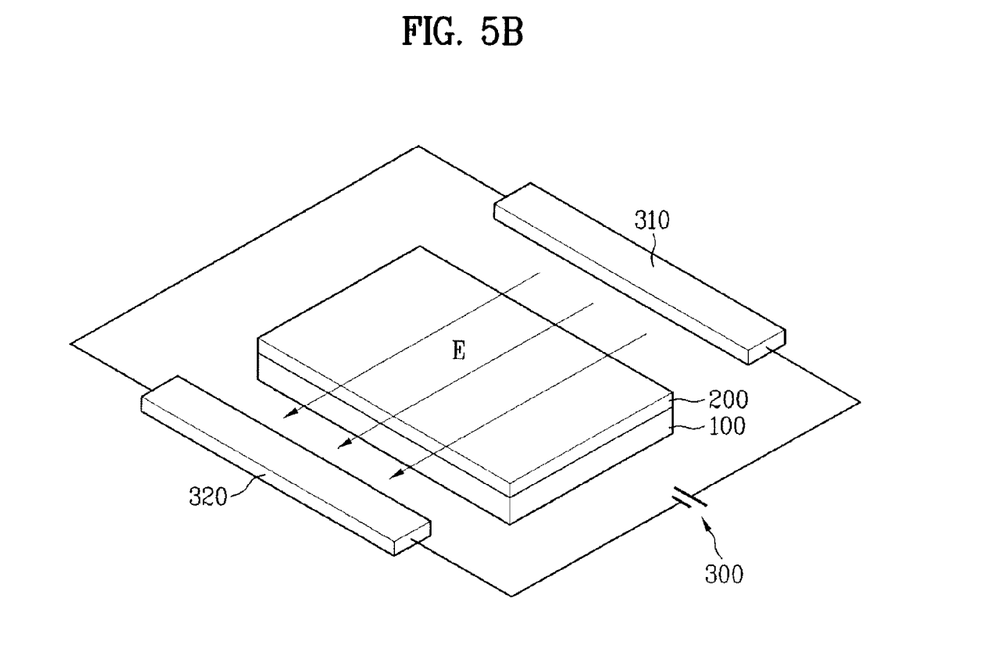

Accordingly, where it is desired to align the alignment material 200 in the direction parallel to the x axis, an electric field may be applied in the direction parallel to the x axis, as illustrated in FIG. 5A. Where it is desired to align the alignment material 200 in the direction perpendicular to the x axis, an electric field may be applied in the direction perpendicular to the x axis, as illustrated in FIG. 5B. Where it is desired to align the alignment material 200 in the direction diagonal to the x axis, an electric field may be applied in the direction diagonal to the x axis, as illustrated in FIG. 5C.

Figure 5C:
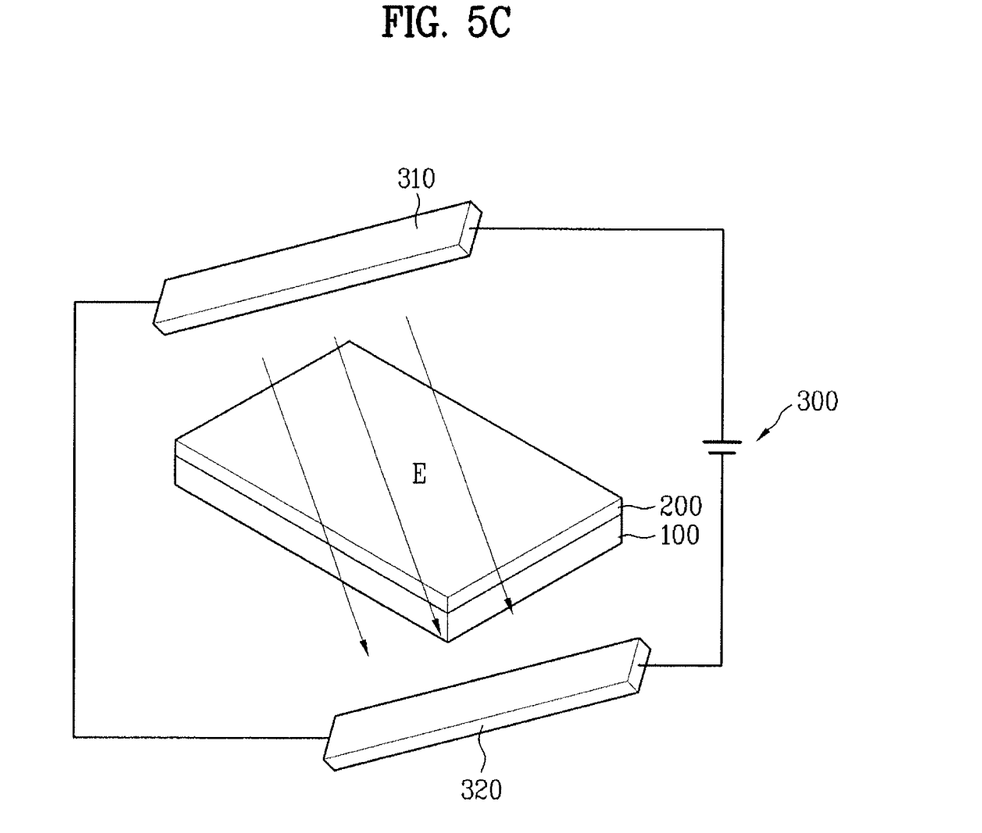

To vary the direction of the electric field applied, as illustrated in FIGS. 5A to 5C, the electric field generator 300 or the substrate 100 may be rotated.

Figure 4D:
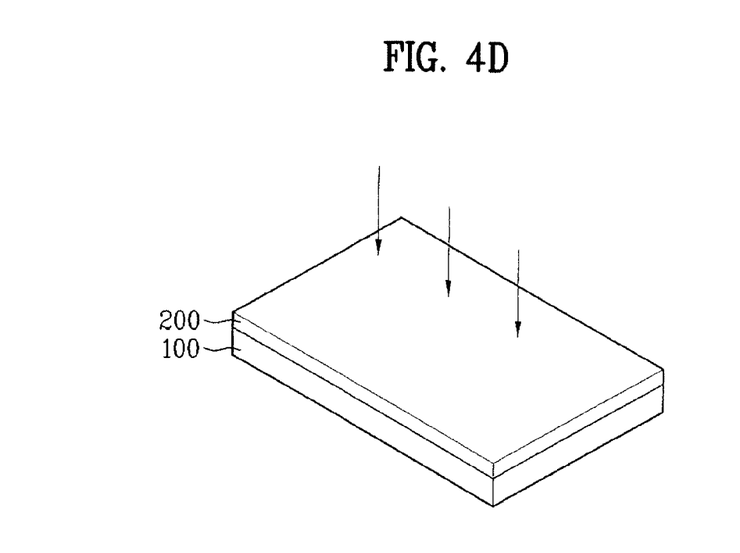

Referring to FIG. 4D, the curing process is performed. After determining the alignment direction of the alignment material 200 by application of the electric field, the alignment material 200 is cured, whereby the alignment direction of the alignment material 200 is fixed.

The curing process is performed by applying heat, wherein a temperature for the curing process may be varied according to the kind of the substrate applied. As mentioned above, if using the plastic substrate, the curing process may be performed at a temperature below about 100° C.

Coating the alignment material 200 (shown in FIG. 4B), applying the electric field (shown in FIG. 4C), performing the curing process (shown in FIG. 4D), may be performed consecutively thereby decreasing the process time.

FIGS. 6A to 6D are process diagrams schematically illustrating forming an alignment layer for a liquid crystal display by application of a magnetic field according to another embodiment of the present invention.

Figure 6A:
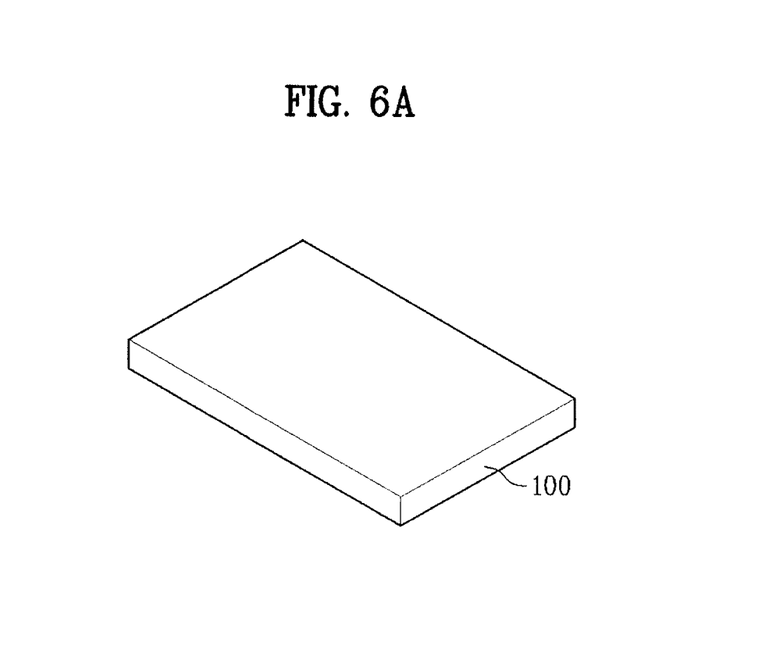
FIGS. 6A to 6D are process diagrams illustrating forming an alignment layer of an LCD device according to another embodiment of the present invention.

First, as illustrated in FIG. 6A, a substrate 100 is prepared.

Constituent elements that can be formed on the substrate 100 may vary depending on the mode of liquid crystal displays, as in the previous embodiment. In addition to a glass substrate, a transparent substrate, such as a flexible substrate or a plastic substrate, can be used in the present invention.

Figure 6B:
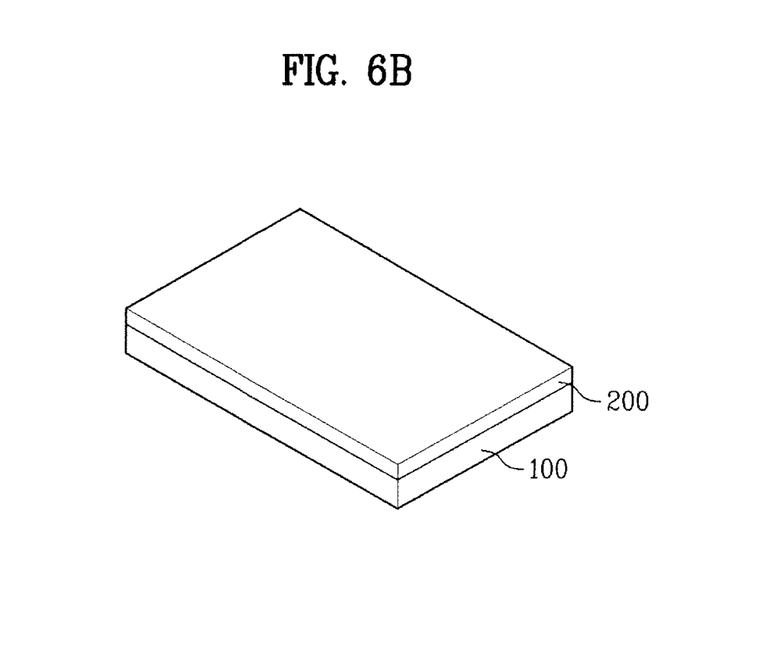

Then, as illustrated in FIG. 6B, an alignment material 200 is applied to the substrate.

The kinds of the alignment material 200 are the same as those described in the previous embodiment.

Figure 6C:
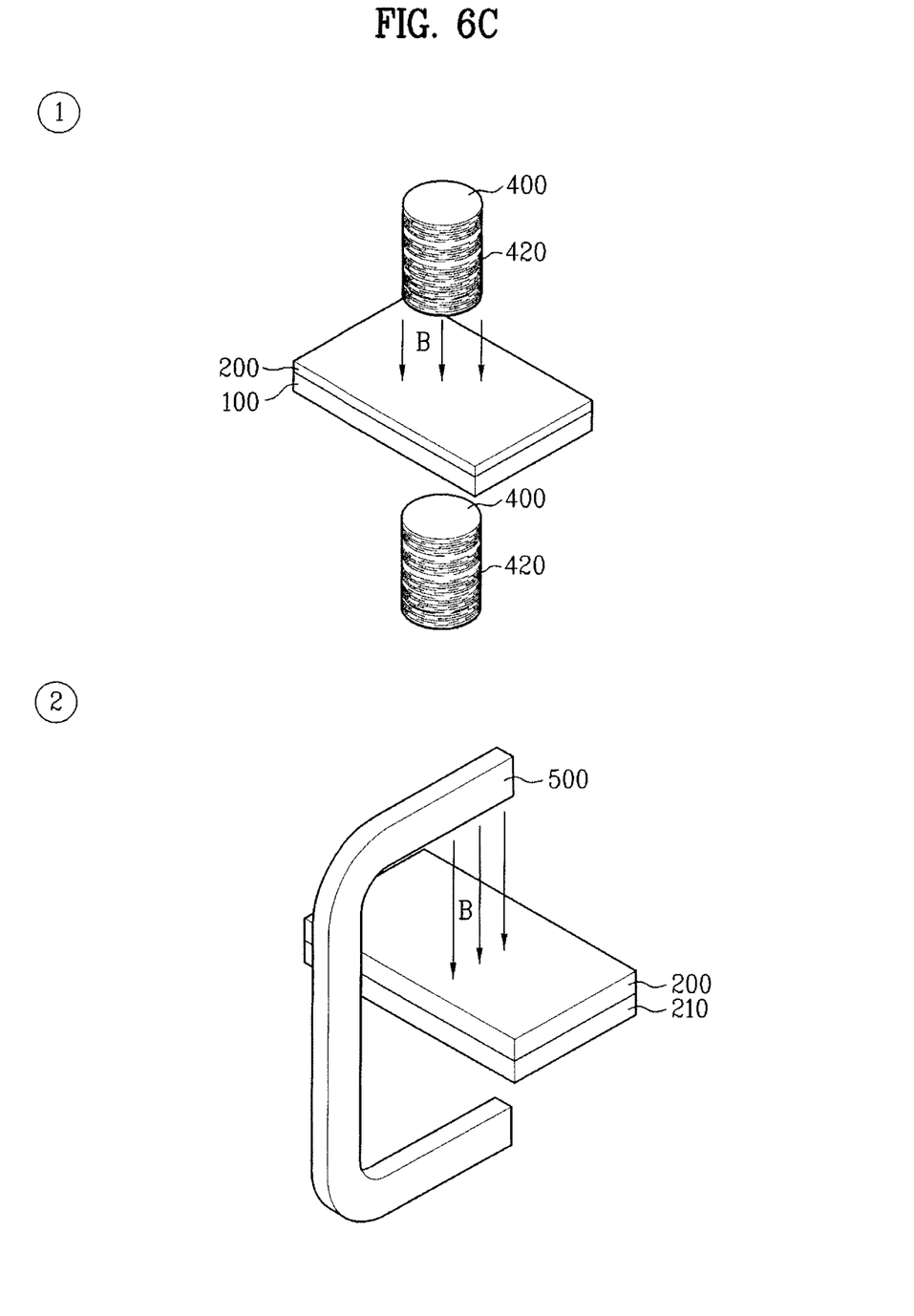

Then, as illustrated in FIG. 6C, a magnetic field B is applied to the alignment material 200 using a magnetic field generator 400 or 500 to determine the alignment direction of the alignment material 200.

The magnetic field B can be applied using an electromagnet system in which a pair of electromagnets 400 wound with coils 420 are arranged to face each other through the substrate, as illustrated in FIG. 6C(1), or a horseshoe magnet surrounding the substrate as illustrated in FIG. 6C(2), but the present invention is not limited thereto.

In case of the previous embodiment of the present invention, the electrodes of the electric field generator may be connected to the substrate when applying the electric field. Such process requires an additional step for connecting the electrode part to the substrate. In case of the present embodiment of the present invention, it is unnecessary to provide an additional process for connecting an magnetic field application part to the substrate. Thus, the process of applying the magnetic field may provide a greater yield than the process of applying the electric field.

Since the alignment material 200 is aligned in the direction perpendicular to the direction of the magnetic field applied, the magnetic field may be applied in the direction perpendicular to the alignment direction of the alignment material 200.

To vary the direction of the magnetic field applied, the magnetic field generator 400 or 500 or the substrate 100 may be rotated.

Figure 6D:
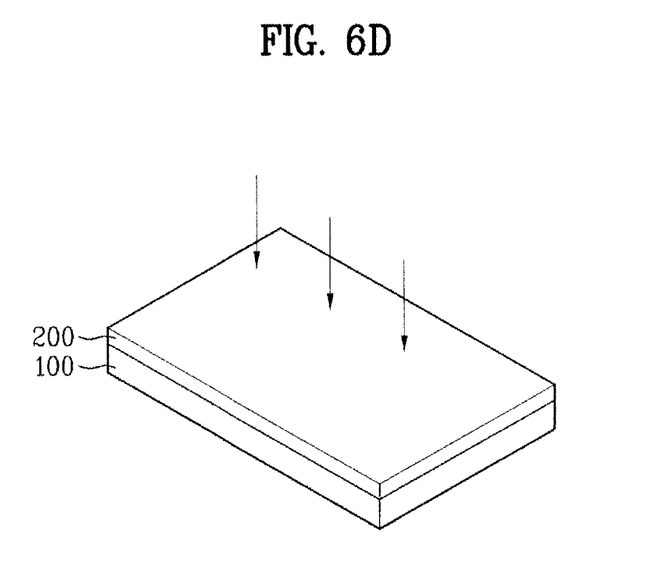

After that, as shown in FIG. 6D, a curing process is performed.

The curing process is performed by applying heat, wherein a temperature for the curing process may be varied according to the type of the substrate used. As mentioned above, if using a plastic or flexible substrate, the curing process may be performed at a temperature below about 100° C.

Coating the alignment material 200 (shown in FIG. 6B), applying the magnetic field (shown in FIG. 6C), and performing the curing process (shown in FIG. 6D) may be performed consecutively thereby decreasing the process time.

Figure 7:
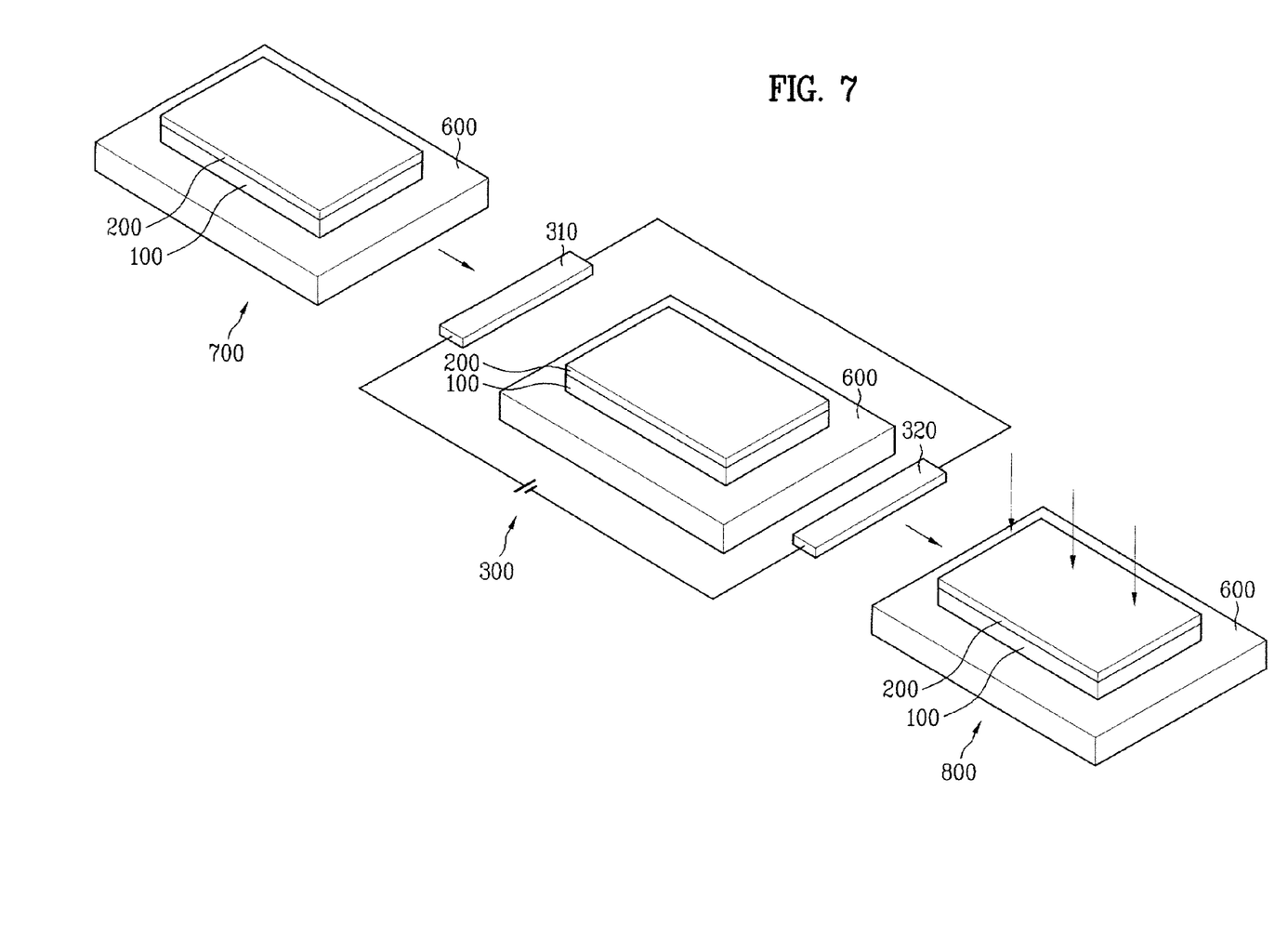
FIG. 7 illustrates an alignment layer formation unit according to an embodiment of the present invention.

FIG. 7 schematically illustrates an apparatus for forming an alignment layer for a liquid crystal display by application of an electric field according to one embodiment of the present invention.

The alignment layer formation unit is provided with a substrate stage 600, an electric field generator 300, and a curing part 800. At this time, a substrate is put on the substrate stage 600, and the electric field generator 300 is formed at the periphery of the substrate stage 600. Also, the curing part 800 is provided to cure an alignment material.

The electric field generator 300 includes an anode 310 and a cathode 320 opposite to the anode through the substrate stage 600. An electric field is applied to a substrate 100 securely mounted on the substrate stage 600. Before the application of the electric field, an alignment material 200 is applied to the substrate 100.

The electric field 300 may be rotated according to the alignment direction of the alignment material 200.

The curing part 800 may include a heater which emits heat to the alignment material 200.

Also, an alignment layer applicator 700 may be arranged before the electric field generator 300. The alignment layer coating part 700 may be a printing system but it is not limited to this.

In this case, the substrate stage 600 having the substrate 100 is consecutively moved through the alignment layer applicator 700, the electric field generator 300, and the curing part 800.

Figure 8:
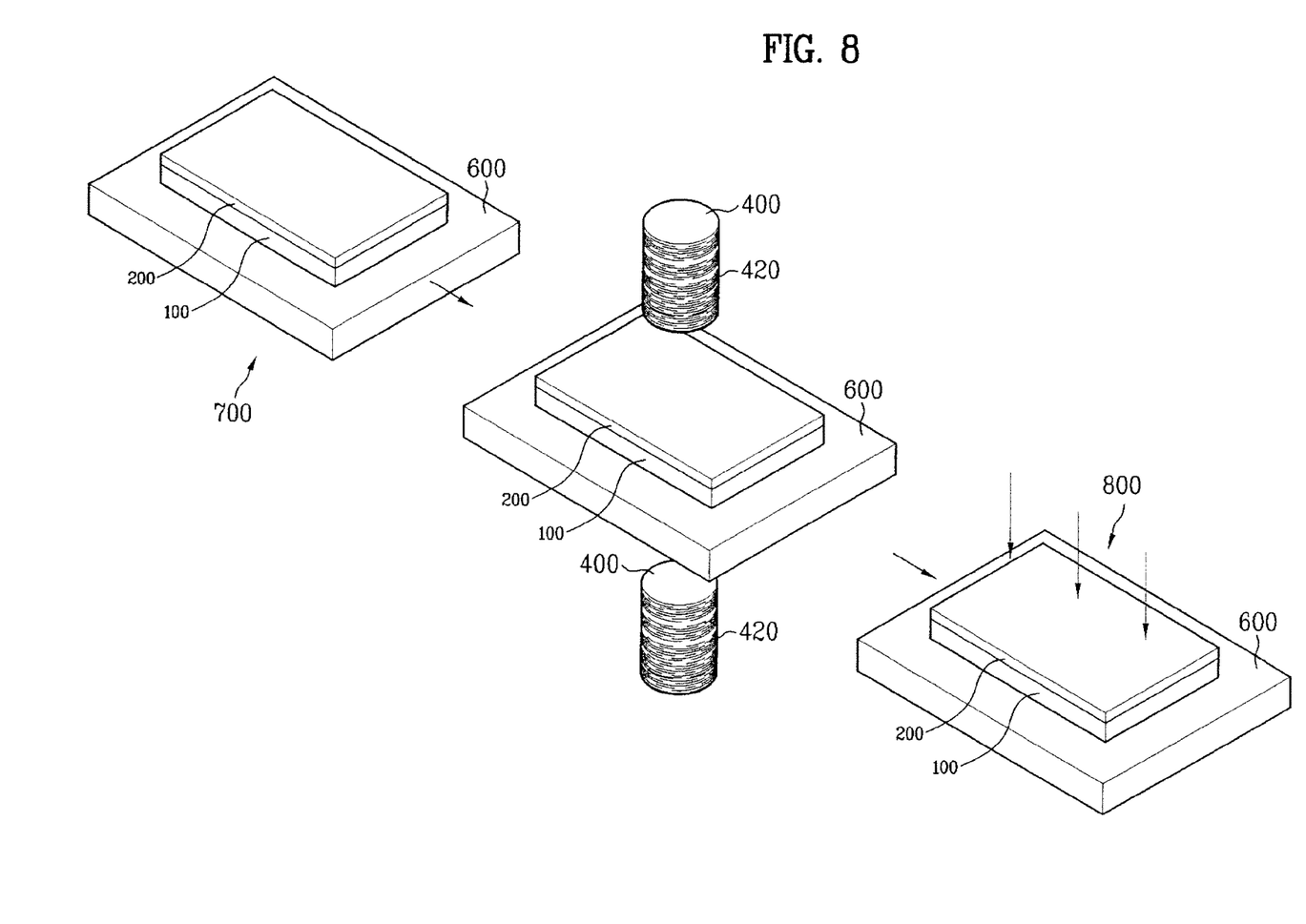
FIG. 8 illustrates an alignment layer formation unit according to another embodiment of the present invention.
Figure 9:
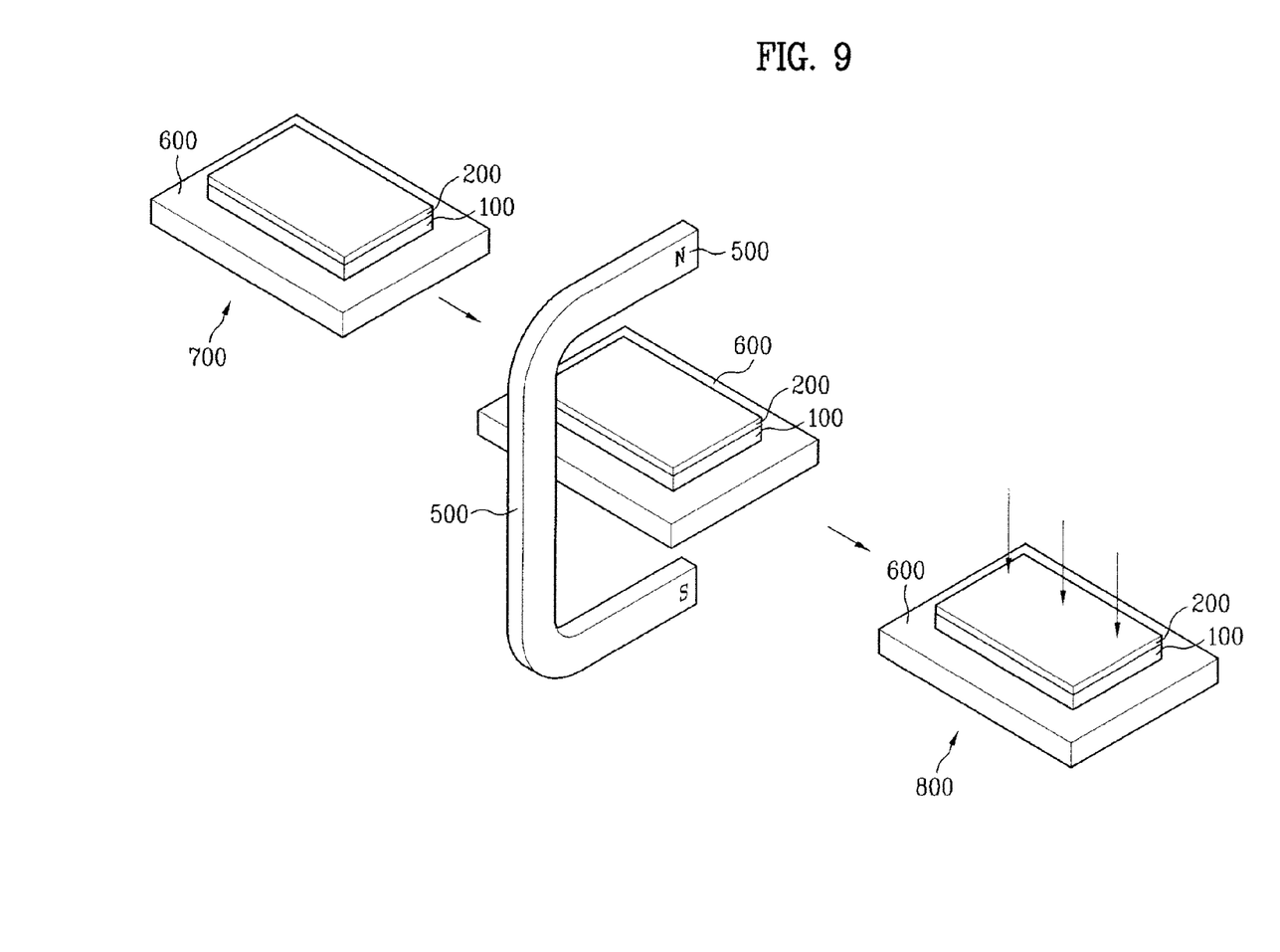
FIG. 9 illustrates an alignment layer formation unit according to another embodiment of the present invention.

FIGS. 8 and 9 schematically illustrate apparatuses for forming an alignment layer for a liquid crystal display by application of a magnetic field according to another embodiment of the present invention.

The alignment layer formation unit is provided with a substrate stage 600, magnetic field generators 400 and 500, and a curing part 800. At this time, a substrate is put on the substrate stage 600, and the magnetic field generators 400 and 500 are provided at the periphery of the substrate stage 600. Also, the curing part 800 is provided to cure an alignment material.

The magnetic field generator may be an electromagnet system 500 in which a pair of electromagnets 400 wound with coils 420 are arranged to face each other through the substrate as illustrated in FIG. 8, or a horseshoe magnet 500 surrounding the substrate as illustrated in FIG. 9, but the present invention is not limited to these structures. Any apparatus can be used so long as it can generate a magnetic field.

The magnetic field generator 400 or 500 may be rotatable so that the direction of the magnetic field applied can be properly varied depending on the alignment direction of the alignment material.

The curing part 800 may include a heater which emits heat to the alignment material 200.

Also, an alignment layer application 700 may be arranged before the magnetic field generators 400 and 500. The alignment layer applicator 700 may be a printing system, but it is not limited to this.

In this case, the substrate stage 600 having the substrate 100 may be consecutively moved through the alignment layer applicator 700, the magnetic field generators 400 and 500, and the curing part 800.

As mentioned above, the method for forming the alignment layer and the alignment layer formation unit according to the related art have the following advantages.

As apparent from the above description, according to the present invention, since the alignment direction of an alignment material is determined by using a field flux (e.g., an electric or magnetic field), no physical contact with a substrate is required and thus the problem of light leakage caused by rubbing alignment can be solved.

Also, the curing process for the alignment material may be performed at a temperature below about 100° C. Thus, it is possible to use a plastic substrate which is weak in heat, or to use a flexible substrate.

In addition, it is possible to consecutively perform the steps of coating the alignment material, applying the electric field or the magnetic field, and curing the alignment material, thereby decreasing the process time.

By rotation of the electric or magnetic field application part, it is possible to change the alignment direction of the alignment material.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An alignment layer formation unit, comprising:
   a substrate stage loading and moving a substrate on which an alignment material is coated;
   an electric field generator, applying an electric field to the alignment material coated on the substrate, to determine an alignment direction of the alignment material; and
   a curing part curing the alignment material at a temperature below 100° C., to fix the alignment direction of the alignment material determined by the electric field,
   wherein the electric field generator includes an anode and a cathode opposing each other at both sides of the substrate stage.

2. An alignment layer formation unit, comprising:
a substrate stage loading and moving a flexible substrate on which an alignment material is coated;
a magnetic field generator applying magnetic field to the alignment material coated on the substrate, to determine an alignment direction of the alignment material; and
a curing part curing the alignment material at a temperature below 100° C., to fix the alignment direction of the alignment material determined by the magnetic field; and
wherein the magnetic field generator includes a pair of electromagnets, on which coil is wound, being opposing each other through the substrate stage or a horseshoe magnet surrounding the periphery of the substrate stage.

3. The unit of claim 1, further comprising an alignment layer applicator before the electric field generator.

4. The unit of claim 2, further comprising an alignment layer applicator before the magnetic field generator.

5. The unit of claim 3, wherein the substrate stage is movable along the alignment layer applicator, the electric field generator, and the curing part.

6. The unit of claim 4, wherein the substrate stage is movable along the alignment layer applicator, the magnetic field generator, and the curing part.

7. The unit of claim 1, wherein the electric field generator is rotatable to vary a direction of the electric field applied, and
wherein the electric field is applied in the same direction as the alignment direction of the alignment material.

8. The unit of claim 2, wherein the magnetic field generator is rotatable to vary a direction of the magnetic field applied, and
wherein the magnetic field is applied in the direction perpendicular to the alignment direction of the alignment material.

9. The unit of claim 2, wherein the flexible substrate is a plastic material.

* * * * *